June 28, 1932.  C. R. SEELING  1,864,768
ROLL FILM CAMERA
Filed March 14, 1930  2 Sheets-Sheet 1
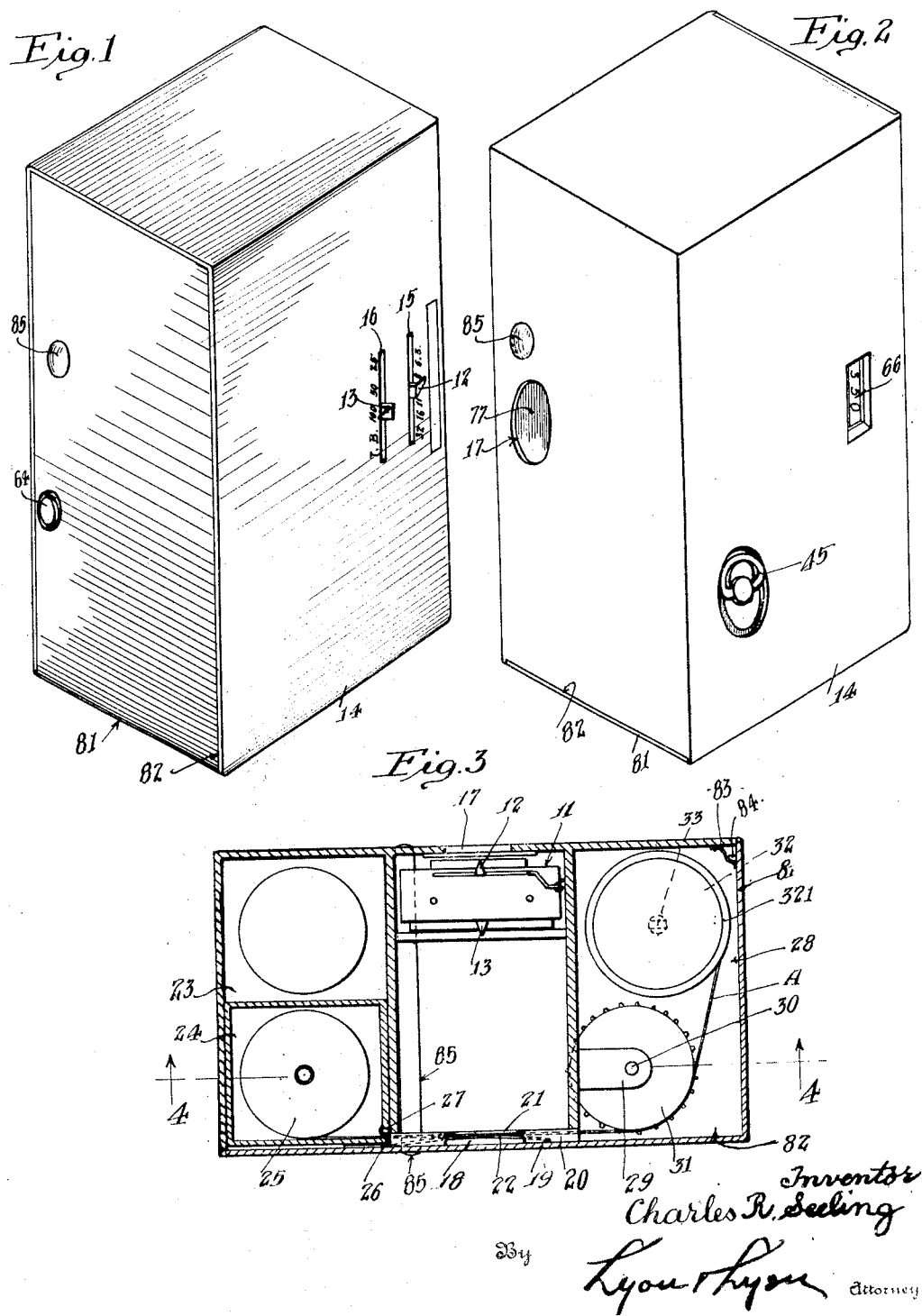

June 28, 1932.  C. R. SEELING  1,864,768
ROLL FILM CAMERA
Filed March 14, 1930   2 Sheets-Sheet 2
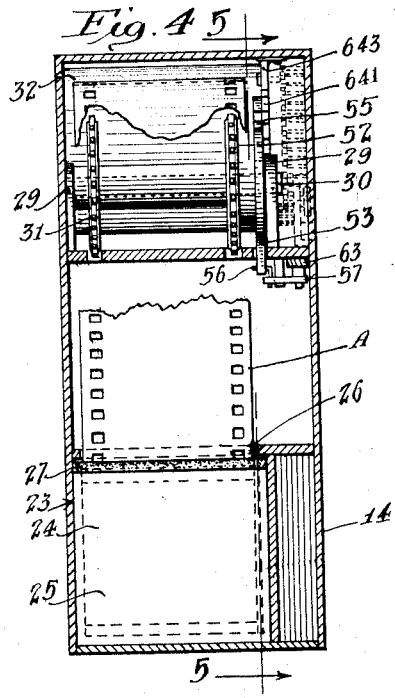
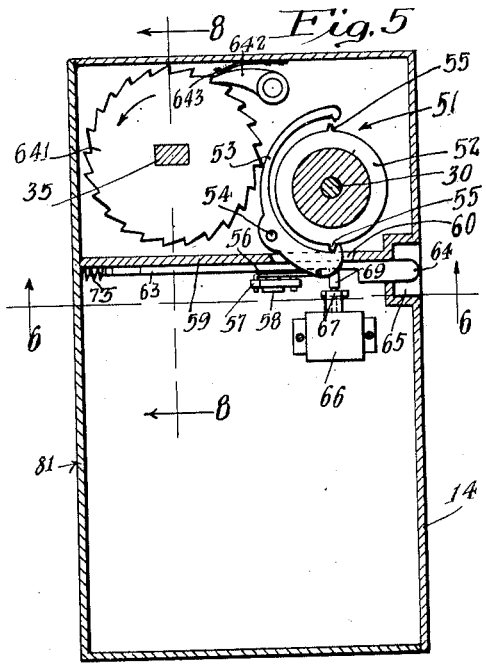
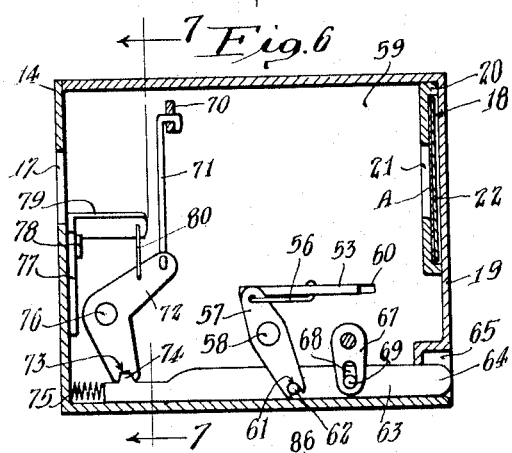
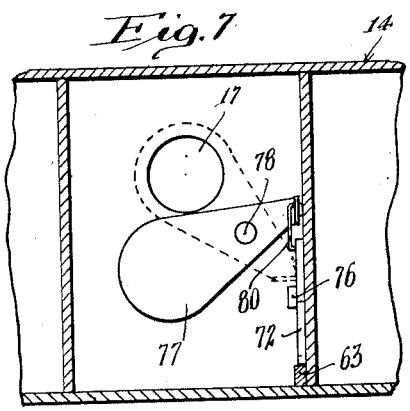
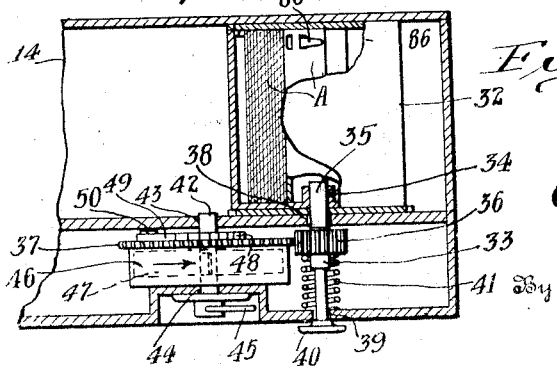
Inventor
Charles R. Seeling
By Lyon & Lyon
Attorneys Patented June 28, 1932

1,864,768

UNITED STATES PATENT OFFICE

CHARLES R. SEELING, OF BURBANK, CALIFORNIA, ASSIGNOR TO PICTOLA CAMERA CO. LTD., OF LOS ANGELES, CALIFORNIA. A CORPORATION OF CALIFORNIA

ROLL-FILM CAMERA

Application filed March 14, 1930. Serial No. 435,742.

This invention relates to roll-film cameras of the type well adapted, for example, to employ long strips of film such as are used in the motion picture cameras. However, this camera is not of the motion picture type, though it is possible to make exposures in rather rapid succession because of the fact that the film is automatically rolled up a predetermined amount after each exposure.

An important object of the invention is simplicity of construction and operation.

One of the principal features of the invention is that by which tensioning of the film is accomplished prior to operation of the shutter, thus avoiding the necessity of engaging the film with a guide or pressure plate while said film is in motion. This obviously avoids scratching the film.

Another very important object is to effect tensioning of the film and operation of the shutter by actuation of a single operating member.

Another important object is to automatically effect winding of the film by actuation of the same operating member that functions to operate the shutter.

Another important object is to protect the lens from dust. This is accomplished by mounting the lens within the camera case in line with an opening through the case and providing an auxiliary shutter that normally closes said opening and that is operated into open position, simultaneously with the lens shutter, by the member that operates the lens shutter.

Another important object is ease with which the driven spool may be removed from and returned to its operating position, thus facilitating loading and unloading of the camera.

Other objects and advantages will appear in the subjoined detailed description.

The accompanying drawings illustrate the invention:

Figure 1 is a perspective view of a roll-film camera constructed in accordance with the provisions of this invention.

Figure 2 is a perspective view of the camera, shown in Fig. 1, turned through an angle of 180° from the position shown in said figure.

Figure 3 is a plan view of the camera with the case shown in section.

Figure 4 is a sectional view on the line indicated by 4—4, Fig. 3.

Figure 5 is a vertical section on the line indicated by 5—5, Fig. 4.

Figure 6 is a horizontal section on the line indicated by 6—6, Fig. 5.

Figure 7 is fragmental view, partly in section, from the line indicated by 7—7, Fig. 6.

Figure 8 is a fragmental vertical section on the line indicated by 8—8, Fig. 5.

A lens unit is indicated at 11 and this may be of the well known type that includes an iris diaphragm and a shutter. There is no necessity of illustrating and describing the lens unit in detail as such units are well understood in this art. As is usual with these lens units, this one, also, has an adjustable member 12 by which the diaphragm is set to different openings, and an adjustable member 13, by which the timing of the shutter is effected. The members 12, 13 preferably project to outside of the camera case 14 through slots 15, 16, respectively, provided in said case. The lens unit 11 is secured in any suitable manner within the case 14 in alinement with an opening 17 in said case, through which opening the light rays enter the lens unit 11.

The film, indicated at A, passes across the inner face of the camera case behind the lens unit 11. At said rear face the film passes through a channel 18 formed between the rear wall 19 of the camera and a U-shaped guide 20, provided with an opening 21 through which the light rays pass from the lens unit to the film. Between the film and the case back 19 is interposed a flat spring 22 which bears lightly against the back of the film. The pressure, however, is not sufficient to cause scratching of the film by the guide 20 and, in fact, there may even be a tendency for the film to buckle slightly, but before the film is exposed it is stretched taut by means hereinafter described.

At one end of the case 14 is a chamber 23 in which is removably positioned a magazine 24 containing a spool 25 on which the unexposed film is wound. The film passes from the spool 25 through a slot 26 in the magazine, the walls of said slot being sealed against light by felt strips 27, in the customary manner.

At the opposite end of the case 14 is another chamber 28 in which is rotatably mounted, by bearings 29, a sprocket shaft 30 on which are mounted the film-feed sprockets 31 that engage the perforations of the film, in the manner well understood in the art relating to motion picture cameras. The film passes around the sprockets 31, thence to a driven or takeup spool 32 which is mounted in a magazine 321 in the chamber 28. The spool 32 is driven by a shaft 33, being detachably connected with said shaft in any suitable manner as, for example, by being provided at one end with a square hole 34 in which fits a square portion 35 of the shaft 33. The shaft 35 is provided with a spur pinion 36 driven by a spur gear 37. The shaft 33 is slidably mounted in bearings 38, 39 and is provided at its outer end, outside of the case 14, with a knob 40 by which the shaft 33 may be slid in and out. The shaft 33 is yieldingly held in its inner position, in engagement with the spool 32, by a coil spring 41 which surrounds the shaft 33 between the pinion 36 and one wall of the case 14.

To remove the spool 32, the knob 40 will be pulled outwardly, thus retracting the square portion 35 of said shaft from the square opening 34.

The gear 37 is rotatably mounted on a shaft 42 supported in bearings 43, 44, and said shaft is provided at its outer end with a key or handle 45 by which the shaft 42 may be turned. Secured to the gear 37 is a drum or spring housing 46 within which is a clock spring 47 secured at one end to the drum 46 and at its other end to the shaft 42. Turning of the shaft 42 in one direction winds the spring and said shaft is prevented from turning in the opposite direction relative to the drum by a ratchet wheel 48 on the shaft 42 and a pawl 49 engaging said ratchet wheel and pivoted at 50 to the gear 37. Thus, when the spring is wound, the drum 46 will tend to rotate in the direction of the arrow thereon in Fig. 8, thus causing turning of the spool 32 in the opposite direction, which results in winding the film A from the sprocket wheels 31, provided said sprocket wheels are free to turn. However, provision is made for releasably holding the sprocket wheels against the film winding tension of the spring 47, as will now be described:

The sprocket shaft is releasably held against turning and is, at the will of the operator, permitted to rotate through a predetermined number of degrees by an escapement, indicated in general by the character 51.

In this instance the escapement is of the well known anchor type, the wheel being indicated at 52 and the pallet lever at 53.

The member 53 rocks on the pivot 54. The wheel 52, in this instance, is provided with two teeth 55 which are diametrically positioned so that when one of the pallets releases one of the teeth the other pallet will engage said tooth, in a manner well understood in the art relating to escapements of this type. The escapement member 53 is actuated by a link 56 which connects said member 53 with a lever 57 pivotally mounted at 58 on a partition member 59 of the case, this partition member having a slot 60 therein through which the escapement member 53 projects. The lower end of the lever 57 is provided wth a slot 61 engaged by a stud 62 that projects from an operating member 63 provided at one end with a button 64 that lies within a recess 65 in one side of the case. When the button 64 is first moved inwardly it swings the lower end of the escapement member 53 downwardly to the left in Fig. 5, thus urging the link 56 to the right, thereby entailing a slight counter-clockwise movement of the escapement member 53, in Fig. 5, whereupon the spring 47 becomes effective to turn the spool 32 slightly, thereby drawing the film taut between the sprockets and the feed-spool 25. While winding the spring 47, the spool 32 will be prevented from turning in a direction to loosen the film by reason of said spool 32 being provided at one end with a ratchet wheel 641 engaged by a pawl 642 yieldingly held toward the ratchet wheel 641 by a spring 643. Thus, in Fig. 5, the ratchet wheel 641 and with it the spool 32, may turn counterclockwise but is prevented from turning clockwise.

Inward motion of the button 64 also effects actuation of a counter 66, the actuating arm 67 of which is provided with a slot 68 engaged by a stud 69 that projects from the operating member 63. The counter 66 thus records the number of exposures. The shutter operating arm of the lens until 11 is indicated at 70 and actuation of said arm is also effected by inward motion of the operating member 63, since the arm 70 is connected by a link 71 to one arm of a bell crank lever 72, the other arm of said bell crank lever being provided with a notch 73 engaged by an upward projection 74 on the operating member 63. A coil spring 75 between one of the case walls and the inner end of the operating member 63 retracts the member 63 when the operator ceases to press upon the button 64. The bell crank lever 72 is pivoted at 76 to the partition member 59.

Though not absolutely necessary, it is advisable to close the opening 17 when an exposure is not being made and, accordingly, there is preferably provided an auxiliary shutter 77 that is pivoted at 78 to the case at one side of the opening 17.

The shutter 77 is provided with an inwardly projecting arm 79 to which is connected one end of a link 80 and the other end of said link connects with one arm of the bell crank lever 72 in such manner that movement of the bell crank 72 in a direction to operate the shutter of the lens unit 11 will also move the auxiliary shutter 77 into open position.

After the operating member 63 has been moved inwardly sufficiently far to actuate the shutter, the operator will release the member 63, whereupon the spring 75 operates to move the member 63 to the right in Fig. 6, thereby turning the lever 57 counterclockwise which actuates the escapement member 53 out of engagement with the lower tooth 55, thereby permitting the sprockets to be turned by the pull exerted on the film through the spool 32 by the spring 47. When the escapement member 53 is thus actuated, it moves its upper pallet into the path of movement of the lower tooth 55 so that said tooth will be stopped by said pallet, thus permitting but one-half of a revolution of the sprockets. This amount of movement, together with the diameter of the sprockets, is such as to move the film the requisite distance so that each time the film is actuated an unexposed portion is positioned behind the opening 21.

Preferably the case 14 is constructed so that it may be readily opened and, accordingly, an L-shaped member 81 forms a cover which closes the opening 82 that extends around two sides of the case. The cover 81 may be held in place by any suitable means as, for example, spring detents 83 that engage shoulders 84 on the inner face of the case adjacent to the opening 82. The camera is preferably provided with a finder 85 which, in this instance, is of the direct vision type.

The foregoing will make clear the construction and operation of the invention and, briefly stated, the operation is as follows:

The spring 47 will be wound up by turning the key 45 and the camera is then ready for making exposures. The operator, having adjusted the diaphragm to the desired opening by moving the arm 12, and having adjusted the shutter mechanism of the lens unit to the desired speed by turning of the member 13, he will sight through the finder 85 the scene that is to be taken and he will then press the button 64. The initial inward movement of the button 64, as explained above, produces tensioning of that portion of the film that extends between the sprockets and the feed-spool 25. Further inward motion of the button actuates the counter 66 and still further inward motion of said button actuates the shutter operating arm 70 and the shutter 77.

It is to be noted that the link 80 connects with the bell crank 72 at a point that is closer to the pivot 76 than the point at which the link 71 connects with said bell crank lever, thus effecting quicker opening movement of the shutter 77 so that the opening 17 will be completely uncovered by the time that the arm 70 has been actuated sufficiently far to produce operation of the shutter of the lens unit 11. Assuming, for example, that the member 13 was adjusted for instantaneous exposures, in the manner well understood in this art, the exposure is completed by this single inward actuation of the button 64 and the operator will then release the button 64, whereupon the spring 75 will retract the member 63 and with it all of the parts that are controlled by movement of said member 63, thus effecting closing of the shutter 77 and such movement of the lever 57 as results in the escapement member 53 releasing the member 52, whereupon the spring 47 immediately functions to turn the spool 32 so as to wind up a portion of the film. This winding action of the film produces rotation of the sprockets 31 until the tooth 55 that has been released from one of the pallets of the member 53 comes into engagement with the other pallet of said member 53. Thus a predetermined amount of film is wound on the spool and then the film stops, thus bringing an unexposed portion of the film into position for the making of another exposure.

If "bulb" operation of the shutter of the lens unit 11 is desired, the operator will move the member 13 to the index "B", shown in Fig. 1, whereupon inward pressure on the button 64 will open said shutter and said shutter will remain open until the operator releases the button 64. If a time exposure is desired, the member 13 will be moved to the index "T" and the operator will then press once on the button 64 to open the shutter of the lens unit and the shutter 77. The rod 63 will move sufficiently far to accomplish this and then it will be retained in this position by reason of the arm 70 being held against retraction by the shutter mechanism of the lens unit in a manner well understood in the art relating to lens units of this type. After the desired exposure time has elapsed, the operator will again press the button 64, thus effecting release of the shutter of the lens unit and consequent closure of both shutters.

While the film may be attached to the spools in any approved manner, it is preferable to provide on the take-up spool, at least, outwardly projecting hooks 86 which are spaced the same distance as are the rows of perforations along the opposite edges of the film. These hooks have their points facing in the direction of film-winding rotation of the spool 32 so that, when the naturally curling end portion of the film is presented to the spool 32 rearward of the hooks, said portion will closely fit and slide around said spool over the hooks, whereupon turning of the spool 32 will cause the hooks to hook into two of the perforations of the film and winding of the film upon the spool. The other spool 25 may also have hooks corresponding to the hooks 86, as will be readily understood from the foregoing description of the spool 32.

I claim:

1. A roll-film camera comprising a case, a stationary fixed focus lens carried by the case, a film moving means in the case, and a means in the case operable to first expose a portion of the film and thereafter to automatically move the film a predetermined amount.

2. A roll-film camera comprising a case, a spring means in the case to wind a film, and a releasable means in the case to hold the film against the tension of the winding means, said releasable means being first operable to one position to tension the film and then operable to another position to permit a limited movement of the film by the spring means.

3. A roll-film camera comprising a case, a spring means in the case to wind a film, and a releasable means in the case to hold the film against the tension of the winding means, said releasable means being first operable in one direction to tension the film and then operable in the opposite direction to permit a limited movement of the film by the spring means.

4. A roll-film camera comprising a case, a spring means in the case to wind a perforate film, a releasable means including a sprocket in the case to hold the film against the tension of the winding means, said releasable means when operated permitting a limited movement of the film, a member operable to release the releasable means, and a means operable by said member prior to said release to expose a portion of the film.

5. A roll-film camera comprising a case, a spring means in the case to wind a film, a releasable means in the case to hold the film against the tension of the winding means, said releasable means being first operable to one position to tension the film and then operable to a second position to permit a limited movement of the film by the spring means, a member to operate the releasable means into said positions, and a means operable by said member prior to its operation of the releasable means into the second position to expose a portion of the film.

6. A roll-film camera comprising a case, a spring means in the case to wind a film, a releasable means in the case to hold the film against the tension of the winding means, said releasable means being first operable to one position to tension the film and then operable to a second position to permit a limited movement of the film by the spring means, a member to operate the releasable means into said positions, and a means operable by said member prior to its operation of the releasable means into the second position and subsequent to its operation of the releasable means into the first position to expose a portion of the film.

7. A roll-film camera comprising a case, a spring means in the case to wind a film, a releasable means in the case to hold the film against the tension of the winding means, said releasable means being first operable in one direction to tension the film and then operable in the opposite direction to permit a limited movement of the film by the spring means, a member to operate the releasable means in said directions, and a means operable by said member prior to its operation of the releasable means in said opposite direction to expose a portion of the film.

8. A roll-film camera comprising a case, a spring means in the case to wind a film, a releasable means in the case to hold the film against the tension of the winding means, said releasable means being first operable in one direction to tension the film and then operable in the opposite direction to permit a limited movement of the film by the spring means, a member to operate the releasable means in said directions, and a means operable by said member prior to its operation of the releasable means in said opposite direction and subsequent to its operation of the releasable means in the first mentioned direction to expose a portion of the film.

9. In a roll-film camera, a case, a sprocket rotatably mounted in the case, the teeth of said sprocket adapted to engage perforations in a perforate strip of film, a means tending to wind the film from the sprocket, an escapement controlling the rotary movement of the sprocket, and manual means to actuate the escapement.

10. In a roll-film camera, a case, a spool rotatably mounted in the case, a spring tending to rotate the spool, a sprocket adapted to engage perforations in a perforate film that may be wound on the spool, a means releasably holding the sprocket from turning, said means when released permitting limited rotary movement of the sprocket, and a means for releasing the sprocket-holding means.

11. In a roll-film camera, a case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, and a means for releasing the sprocket-holding means.

12. In a roll-film camera, a case, a spring means in the case to wind a film, a movably mounted toothed member engageable with perforations in the film, an anchor type escapement wheel operably connected with the toothed member, an anchor type pallet lever in cooperative relation with the escapement wheel, and a means to operate said lever.

13. In a roll-film camera, a case, a spring means in the case to wind a film, a movably mounted toothed member engageable with perforations in the film (an anchor type escapement wheel operably connected with the toothed member, an anchor type pallet lever in cooperative relation with the escapement wheel, an operating member, and a means operable by movement of the operating member in one direction to first turn the lever in a direction to cause one of the pallets to urge the toothed wheel in a direction opposed to the winding direction of the film to pull the film taut, further movement of the operating member in said first direction turning the lever in a direction to cause said pallet to release the toothed wheel so that the film will be wound by the spring means.

14. In a roll-film camera, a case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, a means for releasing the sprocket-holding means, and a means operable by said further movement of the operating member to expose a portion of the film.

15. In a roll-film camera, a case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, a means for releasing the sprocket-holding means, a lens unit provided with a shutter, the case provided with an exposure opening in line with the lens unit, a means operably connecting the shutter with the operating member, a second shutter to close said exposure opening, and a means operably connecting the second shutter with the operating member.

16. In a roll-film camera, a case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, and a means for releasing the sprocket-holding means, and exposing a portion of a perforate film.

17. In a roll-film camera, a combination of a case, spool means for perforate strip film operably mounted in opposed ends of said case, a fixed focus lens carried by said case intermediate said ends, a spring means in the case to wind a perforate film, a movably mounted sprocket engageable with perforations in the film, an anchor type escapement wheel operably connected with the sprocket, an anchor type pallet lever in cooperation with the escapement wheel, and a means to operate said lever.

18. In a roll-film camera, the combination of a case, spool means for perforate strip films operably mounted in opposed ends of said case, a fixed focus lens carried by said case intermediate said ends, a sprocket member operably mounted in one of said ends, a tooth of said sprocket member being engageable with a perforation in a perforate strip film connecting said spools, means tending to rotate a spool to wind the film from the sprocket, an escapement controlling the operation of the sprocket, and manual means to expose a portion of the film and actuate the escapement.

19. In a roll-film camera, the combination of a case, a fixed focus lens carried by the case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, and means operable by said releasing means prior to film movement by said spring means to expose a portion of the film.

20. In a roll-film camera, the combination of a case, a fixed focus lens carried by the case, a spool rotatably mounted in the case, a spring tending to rotate the spool in one direction, a pawl and ratchet preventing rotation of the spool in the opposite direction, a sprocket adapted to engage perforations in a perforate film that may be wound on the spool, a means releasably holding the sprocket from turning, said means when released permitting limited rotary movement of the sprocket, and means operable for releasing the sprocket-holding means and position the film in the focal plane of said lens and to permit a limited movement of the film by said spring means.

Signed at Los Angeles, California, this 27 day of February, 1930.

CHARLES R. SEELING.